United States Patent Office 3,330,817
Patented July 11, 1967

3,330,817
ISOMERIZATION OF POLYBUTADIENES
Robert E. Rinehart, Rutherford, N.J., assignor to
Uniroyal, Inc., a corporation of New Jersey
No Drawing. Filed Mar. 4, 1963, Ser. No. 262,321
6 Claims. (Cl. 260—94.7)

This invention relates to the isomerization of polybutadienes.

The polymerization of butadiene-1,3 (hereinafter called butadiene) to solid polybutadiene by various means as by emulsion, solution, and bulk polymerization with various catalysts is well known. Such polymerizations, as is known, will give polybutadienes having different proportions of trans-1,4 structure and cis-1,4 structure and vinyl-1,2 structure (hereinafter called trans and cis and vinyl structures, respectively), depending on the conditions of polymerization.

According to the present invention, such solid polybutadienes are isomerized, whereby the proportions of trans and cis and vinyl structures in the polymer are radically changed.

In carrying out the present invention, a monomer free polybutadiene is treated with a rhodium salt which isomerizes the polybutadiene. In polybutadienes other than high trans-polybutadienes there is generally an increase in the proportion of trans structure. Transpolybutadiene is useful as a diluent for balata. In trans-polybutadienes, there is an increase in the proportion of cis structure. This is because the reaction tends to proceed toward the equilibrium ratio of isomers.

It is known to emulsion-polymerize butadiene in the presence of rhodium salts to give a polybutadiene having at least 85% trans structure as shown in the Smith and Wilkinson U.S. Patent 3,025,286. Trans-polybutadiēnes which are free from monomeric butadiene may be isomerized to increase the cis isomer concentration by the process of the present invention. It is further not evident from U.S. Patent 3,025,286 that a finished solid polymer such as polybutadiene, particularly one that has been polymerized in the absence of a rhodium salt, could be isomerized by treatment with the same rhodium salt that, when present during the polymerization of the monomer, gives a different structural product from that obtained when the polymerization is carried out in the absence of rhodium salt.

The polybutadiene, when contacted with the rhodium salt according to the present invention, may be in solution in a suitable solvent such as benzene or xylene, which solution is preferably emulsified in water by means of a conventional surface-active dispersing agent such as referred to in U.S. Patent 3,025,286, col. 2, line 49 to col. 3, line 20. The polybutadiene may be in the form of an emulsion-polymerized latex which preferably contains the above-referred type of conventional surface-active dispersing agent. The rhodium salt may be the salt of a conventional acid, such as rhodium chloride, bromide, iodide, sulfate, acetate, nitrate or the like. The amount of rhodium salt is not critical and will generally be from 0.01 to 20 parts by weight per 100 parts by weight of the polybutadiene. The time and temperature of treatment of the polybutadiene with the rhodium salt is not critical and generally will be from 1 hour to 10 days, at temperatures from 20° C. to 80° C.

The following example illustrates the invention.

Four different polybutadiene samples A, B, C and D were treated with rhodium chloride according to the present invention.

The polybutadiene, sample A, was a conventional emulsion-polymerized polybutadiene prepared as follows: A solution of 0.5 gram of potassium carbonate, 0.5 gram of potassium persulfate, and 5 grams of potassium oleate in 200 ml. of water was prepared. To this solution was added 0.65 gram of dodecyl mercaptan. The air in the container was replaced by nitrogen, then 100 grams of 1,3-butadiene was added and the container was sealed. The mixture was heated, under good agitation, at 50° C. for 22 hours, during which time polmerization occurred. Polymerization was terminated by the addition of 0.6 gram of potassium dimethyldithiocarbamate. One gram of the antioxidant N,N'-di-(beta-naphthyl)-p-phenylenediamine was added. The conversion was 74%, to give a latex of 27.9% solids concentration. To the latex was added, with stirring, a nearly saturated solution of sodium chloride in water until the latex began to floc, then dilute aqueous hydrochloridic acid was added until the rubbery polymer precipitated as crumb. The crumb was washed with water and dried in vacuo at 50° C. There was obtained 74 grams of polybutadiene having an intrinsic viscosity of 2.62 in benzene, and zero percent gel. The configuration of the double bonds, as determined by infrared analysis, was 68% trans, 17% vinyl and 15% cis.

The polybutadiene, sample B, having a high vinyl content, was prepared according to Example 1 of Belgian Patent No. 549,554. The configuration of the double bonds, as determined by infrared analysis, was 3% trans, 63% vinyl and 34% cis.

The polybutadiene, sample C, was a conventional cis-polybutadiene made by polymerizing butadiene in benzene with a catalyst which was a reaction product of cobaltous chloride, aluminum chloride and aluminum ethyl sesquichloride, as in British Patent No. 884,071. The configuration of the double bonds, as determined by infrared analysis, was 2.3% trans, 1.6% vinyl and 96% cis.

The polybutadiene, sample D, was a trans-polybutadiene prepared as follows: 5 grams of sodium lauryl sulfate, 0.1 gram of $RhCl_3 \cdot 3H_2O$, 200 ml. of water and 100 grams of butadiene-1,3 were placed in a bottle, and the bottle was sealed and placed in a 50° C. bath for 41 hours. The bottle was removed from the bath, excess butadiene was vented off, and the polymer was precipitated with 500 ml. of methanol containing a small amount of phenyl-beta-naphthylamine. The polymer was filtered, washed and dried: yield 10.2 grams. The polymer was dissolved in chloroform, filtered, and reprecipitated with ethanol containing a small amount of phenyl-beta-naphthylamine. The configuration of the double bonds, as determined by infrared analysis, was 97% trans, 0.8% vinyl and less than 3% cis.

Ten-gram portions of samples A, B, C and D, made in different manners as described above, were each dissolved in 200 ml. of xylene, and each solution was stirred into a solution of one gram of $RhCl_3 \cdot 3H_2O$ in 200 ml. of water containing 5 grams of the surface-active dispersing agent sodium dodecylbenzenesulfonate. The resultant emulsions were heated at 80° C., sample A for 52 hours, sample B for 21½ hours, sample C for 44½ hours and sample D for 70 hours. The polybutadienes were precipitated with methanol, washed with water and then methanol and dried under vacuum at room temperature. The percents of trans, vinyl and cis structures of samples A, B, C and D before and after treatment with the rhodium chloride are shown in the table below and were determined by analysis of the infrared structure by the method of R. R. Hampton, Anal. Chem. 21, 923 (1949).

| Polybutadiene Sample | Before RhCl$_3$ Treatment | | | After RhCl$_3$ Treatment | | |
|---|---|---|---|---|---|---|
| | Trans | Vinyl | Cis | Trans | Vinyl | Cis |
| A | 68 | 17 | 15 | 74 | 11 | 15 |
| B | 3 | 63 | 34 | 20 | 67 | 13 |
| C | 2.3 | 1.6 | 96 | 69 | 2 | 29 |
| D | 97 | 0.8 | <3 | 90 | <1 | 9 |

In view of the many changes and modifications that may made without departing from the principles underlying the invention, reference should be made to the appended claims for an understanding of the scope of the protection afforded the invention.

Having thus described my invention, what I claim and desire to protect by Letters Patent is:

1. The method of isomerizing a polybutadiene containing cis, trans, and vinyl isomers at a non-equilibrium ratio comprising, contacting a monomer-free polybutadiene in solution with a rhodium salt selected from the group consisting of rhodium chloride, bromide, iodide, sulfate, acetate or nitrate at a temperature of between about 20° C. to about 80° C.

2. The method of claim 1 in which the rhodium salt is rhodium chloride.

3. The method of isomerizing a polybutadiene containing cis, trans, and vinyl isomers at a non-equilibrium ratio, comprising contacting in solution a monomer free polybutadiene having a maximum trans-isomer concentration of 68% with a rhodium salt selected from the group consisting of rhodium chloride, bromide, iodide, sulfate, acetate or nitrate at a temperature of between about 20° C. and about 80° C. resulting in an increase in the trans-isomer concentration.

4. The method of claim 3, in which the rhodium salt is rhodium chloride.

5. The method of isomerizing a polybutadiene containing cis, trans, and vinyl isomers at a non-equilibrium ratio, comprising contacting in solution a monomer free polybutadiene having a minimum trans-isomer concentration of 97% with a rhodium salt selected from the group consisting of rhodium chloride, bromide, iodide, sulfate, acetate or nitrate at a temperature of between about 20° C. and about 80° C. resulting in an increase in the cis isomer concentration.

6. The method of claim 5 in which the rhodium salt is rhodium chloride.

References Cited

UNITED STATES PATENTS 3,025,286  3/1962  Smith et al. _____ 260—94.6

OTHER REFERENCES

Rinehart et al.: JACS 84, Nov. 5, 1962, pp. 4145 to 4147.

JOSEPH L. SCHOFER, *Primary Examiner.*

C. R. REAP, L. WOLF, J. A. SEIDLECK,
*Assistant Examiners.*